United States Patent
Liu et al.

(10) Patent No.: US 12,551,568 B2
(45) Date of Patent: Feb. 17, 2026

(54) ANTI-CLAUDIN 6 ANTIBODY AND ANTIBODY-DRUG CONJUGATE

(71) Applicant: Guangzhou Medical University, Guangdong (CN)

(72) Inventors: Ming Liu, Guangdong (CN); Fanen Kong, Guangdong (CN); Ningfang Ma, Guangdong (CN); Yunqiang Tang, Guangdong (CN); Maobin Xie, Guangdong (CN)

(73) Assignee: Guangzhou Medical University, Guangzhou (CN)

( * ) Notice: Subject to any disclaimer, the term of this patent is extended or adjusted under 35 U.S.C. 154(b) by 914 days.

(21) Appl. No.: 17/842,914

(22) Filed: Jun. 17, 2022

(65) Prior Publication Data

US 2022/0356243 A1 Nov. 10, 2022

Related U.S. Application Data (63) Continuation-in-part of application No. PCT/CN2020/123772, filed on Oct. 26, 2020.

(30) Foreign Application Priority Data

Dec. 24, 2019 (CN) .......................... 201911360909.7

(51) Int. Cl.
*A61P 35/00* (2006.01)
*A61K 31/455* (2006.01)
*A61K 39/00* (2006.01)
*A61K 39/395* (2006.01)
*A61K 47/68* (2017.01)
*C07K 16/28* (2006.01)

(52) U.S. Cl.
CPC ...... *A61K 47/68033* (2023.08); *A61K 31/455* (2013.01); *A61K 39/39558* (2013.01); *A61K 47/6803* (2017.08); *A61K 47/6849* (2017.08); *A61P 35/00* (2018.01); *C07K 16/28* (2013.01); *A61K 2039/505* (2013.01); *C07K 2317/14* (2013.01)

(58) Field of Classification Search
None
See application file for complete search history.

(56) References Cited

U.S. PATENT DOCUMENTS

2014/0127219 A1* 5/2014 Sahin ................ A61P 35/00
424/139.1

FOREIGN PATENT DOCUMENTS

| CN | 102741289 A | 10/2012 | |
| CN | 107011440 A | 8/2017 | |
| WO | WO-2015014870 A1 * | 2/2015 | .............. A61P 43/00 |

OTHER PUBLICATIONS

NIH peptide definition, https://www.genome.gov/genetics-glossary/Peptide, accessed on Jun. 10, 2025 (Year: 2025).*
Janeway, et al., Immunobiology: The Immune System in Health and Disease, 5th edition, 2001 (Year: 2001).*
Rudikoff, et al., PNAS, 1982, 79, p. 1979-1983 (Year: 1982).*
Lescar et al., J Biol Chem, 1995, 270, 18067-18076 (Year: 1995).*
Edwards, et al., J Mol Biol, 2003, 334, 103-118 (Year: 2003).*
Goel, et al., J Immunol, 2004, 173, 7358-7367 (Year: 2004).*
International Search Report of PCT Patent Application No. PCT/CN2020/123772 issued on Jan. 20, 2021.

* cited by examiner

*Primary Examiner* — Michael Szperka
*Assistant Examiner* — Samantha Lake Hopkins (57) ABSTRACT

The present disclosure discloses an anti-Claudin 6 antibody and an antibody-drug conjugate. The present disclosure relates to an antigen sequence for preparing the Claudin 6 (CLDN6) antibody, a corresponding nucleotide sequence thereof, and a gene engineering vector, engineering bacterium or cell line for expressing the nucleotide sequence. A highly specific CLDN6 antibody may be produced by immunizing an animal with the antigenic polypeptide. Further, a corresponding monoclonal antibody may be obtained by preparing a hybridoma cell with a cell of the immunized animal. The anti-Claudin 6 antibody may be combined with a linking structure and a drug to form an antibody-drug conjugate. The antibody-drug conjugate may deliver the drug to a tumor cell having a positive expression of CLDN6 depending on the targeting effect of the CLDN6, thereby achieving the efficacy of specifically killing the tumor cell, which is of great significance for the treatment of the tumor.

8 Claims, 10 Drawing Sheets

Specification includes a Sequence Listing.

ANTI-CLAUDIN 6 ANTIBODY AND ANTIBODY-DRUG CONJUGATE

CROSS REFERENCE TO RELATED APPLICATIONS

The present application is a continuation-in-part application of PCT Application No. PCT/CN2020/123772 filed on Oct. 26, 2020, which claims the benefit of Chinese Patent Application No. 201911360909.7 filed on Dec. 24, 2019, each of which is incorporated by reference herein in its entirety.

SUBMISSION OF SEQUENCE LISTING ON ASCII TEXT FILE

The Sequence Listing is submitted as an ASCII formatted text file via EFS-Web, with a file name of "Sequence_listing.txt", a creation date of Jun. 15, 2022, and a size of 733 bytes. The Sequence Listing filed via EFS-Web is part of the specification and is incorporated in its entirety by reference herein.

FIELD

The present disclosure relates to the field of biological medicine. The present disclosure relates to an antigen and a corresponding antibody thereof, and particularly to an anti-Claudin 6 antibody and an antibody-drug conjugate.

BACKGROUND

In the 20th century, primary liver cancer has risen to the second cancer killer in China. More than 1 million patients die of liver cancer every year in the world, and the incidence of liver cancer in China accounts for 40% of the world's total incidence. The treatment of liver cancer is mainly surgery, but clinically, 90% of the patients with liver cancer have lost the chance of surgery when they are diagnosed with liver cancer. Furthermore, the recurrence rate is as high as 80% within 5 years after hepatectomy, and the long-term survival rate is still not high. Examples of other methods for treating liver cancer include tissue transplantation, systemic chemotherapy, radiotherapy, and fulguration. However, all these measures exhibit a high recurrence rate, and cause severe side effect, such as transplant rejection. Even if the hepatectomy is successful, there is still a recurrence rate of 25%.

With the rapid development of biotechnology and the completion of the whole genome sequencing of the Human Genome Project (HGP), human beings have entered the post-genome era, in which the research on proteomics has attracted more and more attention. It is the most advantageous approach for solving the problem of early diagnosis of tumors at present to use the proteomic technology to detect, analyze and identify marker proteins and target proteins, and to clarify the relationship and its law between the change in the expression level of the tumor protein and various stages of the generation and development of tumors. Meanwhile, it is also the latest and the most powerful measure in the research on tumors and the drug screening thereof.

In recent years, gene therapy methods established by tissue-specific gene promoters have opened up new ideas for tumor-targeted therapy. The expression of a gene is modulated by its promoter, and the transcription activity of the promoter is directly related to the gene transcription level. Some promoters are strictly tissue-specific. That is, a specific promoter only has activity in a specific tissue. Therefore, some genes are only expressed in specific tissues. Some anti-tumor genes may be targetedly expressed in tumor cells by using the promoters of the tumor tissue-specific genes, thereby achieving the intervention in tumor cells and reducing or even preventing the effect on normal cells.

SUMMARY

In view of the above problem, an object of the present disclosure is to provide an antibody-drug conjugate with high targeting and good efficacy for liver cancer.

In order to solve the above problem, the present disclosure provides an antigenic polypeptide, wherein an amino acid sequence of the antigenic polypeptide is:
 (1a) an amino acid sequence as set forth in SEQ ID NO: 1; or
 (1b) an amino acid sequence having at least 90% identity to SEQ ID NO: 1 and having the same antigenic function as SEQ ID NO: 1.

It has been found through investigation that Claudin 6 (CLDN6) is highly expressed in both the adjacent tissue and the cancer tissue of the early cancer in patients with hepatocellular carcinoma, and the positive expression thereof in these tissues is specific. Therefore, Claudin 6 may be used as a target site for tumor treatment.

The antigenic polypeptide of the present disclosure is obtained through a series of bioinformatic analysis and comparison on the peptide fragments of the polypeptide of Claudin 6, and has the highest score and the smallest crossover with other tight junction structure related proteins. It corresponds to amino acids 27 to 38 in the protein sequence of Claudin 6.

A corresponding linking structure may be added to the end of the polypeptide sequence.

Preferably, when used for connecting to a KIH vector, an amino acid C (cysteine) is added to the end of the sequence.

The present disclosure also provides an encoding gene for the antigenic polypeptide, wherein the encoding gene for the antigenic polypeptide is a nucleotide sequence for encoding an amino acid sequence as set forth in SEQ ID NO: 1.

Further, the present disclosure also provides a corresponding expression vector, engineering bacterium, or cell line which can be prepared by a bioengineering method with the encoding gene for the antigenic polypeptide.

The present disclosure also provides a method for preparing an anti-Claudin 6 antibody with the antigenic polypeptide, the encoding gene, or the expression vector, engineering bacterium, or cell line containing the encoding gene.

The present disclosure also provides an anti-Claudin 6 antibody prepared with the antigenic polypeptide of the present disclosure.

By general technical methods in the art, a corresponding anti-Claudin 6 antibody may be prepared by immunizing an animal through injecting the antigenic polypeptide, or a hybridoma cell is prepared from an immunized animal, and then an antibody is prepared.

The present disclosure also provides a strain of hybridoma cells for expressing the anti-Claudin 6 antibody, i.e., mouse hybridoma monoclonal cells C6-e11, which are prepared with the antigenic polypeptide. The hybridoma cells were deposited in China Center for Type Culture Collection (address: Wuhan University, Luojia Hill, Bayi Road, Wuchang District, Wuhan, Hubei, China) on Nov. 12, 2019 with a deposit number of CCTCC NO.C2019282.

The hybridoma cells are obtained by immunizing an animal with the antigenic polypeptide, separating myeloma cells from the immunized animal for cell fusion, and then selecting clones with a high titer therefrom.

The present disclosure also provides an anti-Claudin 6 monoclonal antibody produced by the hybridoma cell.

The present disclosure also provides an antibody-drug conjugate comprising the anti-Claudin 6 antibody, a linking structure, and a drug, wherein the linking structure is connected to the anti-Claudin 6 monoclonal antibody and the drug respectively.

The new generation of antibody-drug conjugate is a hot area of research and development. The antibody-drug conjugate (ADC) is composed of three important components, an antibody region, a linking region, and a cytotoxic drug region. A target marker (such as a membrane protein) or an antibody specifically expressed by a tumor traces the target in vivo, and is attached to the surface of a cancer cell. The binding of the antibody portion to the target protein triggers a signal, and then the linking region is broken, and drug endocytosis functions to specifically kill the cancer cells. Because Claudin 6 is specifically expressed in a liver cancer cell, Claudin 6 may be used as a good drug target. Claudin 6 antigen and antibody per se may induce an immune response, the antibody-drug conjugate containing Claudin 6 may deliver the drug to a tumor cell having a positive expression of Claudin 6, and specifically works without affecting normal cells, thereby reducing the side effect. The present disclosure provides a new idea for treating a tumor, especially a tumor having a positive expression of Claudin 6, which is of great significance.

In a preferred embodiment of the present disclosure, the linking structure is SMCC, and the drug is maytansine.

SMCC is a class of bi-functional coupling agents containing N-hydroxysuccinimide (NHS) active ester and maleimide, and may bond together compounds respectively containing a mercapto group and an amino group. The NHS active ester and the primary amine (—NH$_2$) form an amide bond at an environment of pH 7-9, and the maleimide and the mercapto group (—SH) form a thioether bond at an environment of pH 6.5-7.5. In an aqueous solution, the hydrolysis of the NHS active ester and the reaction with the amino group are competitive reactions. Maleimide is more stable than NHS, but when the pH is higher than 7.5, maleimide will be hydrolyzed slowly, losing the specificity for reacting with the mercapto group. Thus, SMCC is typically used at an environment of pH 7.2-7.5, and the reaction of NHS is carried out first.

Because SMCC has a very small molecular weight and links the compounds through chemical bonds, it has a high efficiency, and can be well separated from the drug molecule. Further, the condition for linking is mild (around pH=7.0), which will not affect the activity of the antibody. The cyclohexane ring in the SMCC structure may reduce the hydrolysis rate of maleimide, such that proteins may be freeze-dried and stored for a period after they are modified with SMCC.

Because the SMCC linker requires the drug to have a mercapto group, it is necessary to select the drug having a mercapto bond. Maytansine, as an anti-cancer drug with high efficiency, low toxicity and high safety, may be connected to SMCC. It is proved through research that maytansine has a strong anti-tumor effect on solid tumor, ovarian cancer, breast cancer, nasopharyngeal cancer, bone cancer, lymphoma, and the like, and the clinical effect has also been demonstrated.

The present disclosure also provides a method of preparing a medicant or pharmaceutical composition for treating a tumor having a positive expression of Claudin 6 with the antigenic polypeptide, the encoding gene for the antigenic polypeptide, the expression vector, engineering bacterium or cell line containing the encoding gene, the monoclonal cell line, the monoclonal antibody, or the antibody-drug conjugate.

Further, the tumor having a positive expression of Claudin 6 is a liver tumor.

The present disclosure also provides a pharmaceutical composition comprising the antibody-drug conjugate.

In a preferred embodiment of the present disclosure, the pharmaceutical composition further comprises sorafenib.

DETAILED DESCRIPTION

For the purpose of better describing the object, the technical solutions, and the advantages of the present disclosure, the present disclosure will be further described below with reference to the drawings and particular examples.

Example 1 The Antigen Sequence and its Preparation

A fragment of polypeptide sequence having the highest score and the smallest crossover with other tight junction structure related proteins was screened through bioinformatic analysis and comparison:

LPMWKVTAFIGN (SEQ ID NO: 1).

The polypeptide sequence corresponds to amino acids 27 to 38 in the protein sequence of Claudin 6.

For the convenience of connecting to a corresponding vector KIH, a linking structure C (cysteine) was added to the end of the above sequence to synthesize the following polypeptide fragment with a purity up to 90%:

LPMWKVTAFIGNC (SEQ ID NO: 2)

Example 2 Preparation of the Antibody

The synthesized polypeptide sequence (SEQ ID NO: 2) was coupled with a vector protein (such as KLH), and 3 BALB/c mice were boosted through a standard procedure. The mouse having the best immune response was selected. Spleen cells and myeloma cells were taken from the mouse for cell fusion to prepare hybridoma cells.

The hybridoma cells obtained were subjected to proliferation and ELISA screening to obtain clones with a high titer. Then, 2-8 positive parent cells were subcloned by a limiting dilution method. Finally, a strain of positive clones were determined for subtype identification. The positive clone cells were deposited in China Center for Type Culture Collection (address: Wuhan University, Luojia Hill, Bayi Road, Wuchang District, Wuhan, Hubei, China) on Nov. 12, 2019 with a deposit number of CCTCC NO.C2019282.

The positive clone cells were amplified and cultured for ascites production in 5 mice respectively, and subjected to protein G purification to obtain corresponding monoclonal antibodies.

Example 3 The Preparation and Identification of the Antibody-Drug Conjugate

1. Main materials
Antibody: the monoclonal antibody obtained in Example 2 (hereinafter abbreviated as Ab);
Linking structure: SMCC, purchased from AAT Bioquest Company (USA);
Drug: maytansine (hereinafter abbreviated as DM1).
2. Preparation method
1) SMCC was dissolved in DMSO, and stored at 4° C.
2) Ab and SMCC were mixed in a conjugated buffer (50 mm potassium phosphate, 50 mm sodium chloride, and 2 mm EDTA, at pH 7.2) in a molar ratio of 1:10, and stirred at 4° C. for 4-6 h.
3) The mixed solution was placed in a dialysis bag (M =5000) after reaction, and dialyzed at 4° C. for three days.
4) The dialyzate was collected, and freeze dried in a vacuum freeze dryer.
5) The protein sample was quantitatively analyzed with BCA.
6) The modified antibody and the DM1 molecule were mixed in a PBS buffer (pH=7.0) in a molar ratio of 1:10, and stirred at 4° C. for 4-6 h.
7) The mixed solution was added to a dialysis bag (M=5000), and dialyzed at 4° C. for three days.
8) The dialyzate was collected, and freeze dried in a vacuum freeze dryer.
9) The absorbance of the Ab-DM1 conjugate was determined at 252 nm, and the antibody was quantified with BCA.
3. Complex determination
1) UV-vis absorption spectrum The UV absorption spectra of DM1, Ab, and Ab-DM1 were determined respectively. The determination results were shown in FIG. 1.

Figure 1:
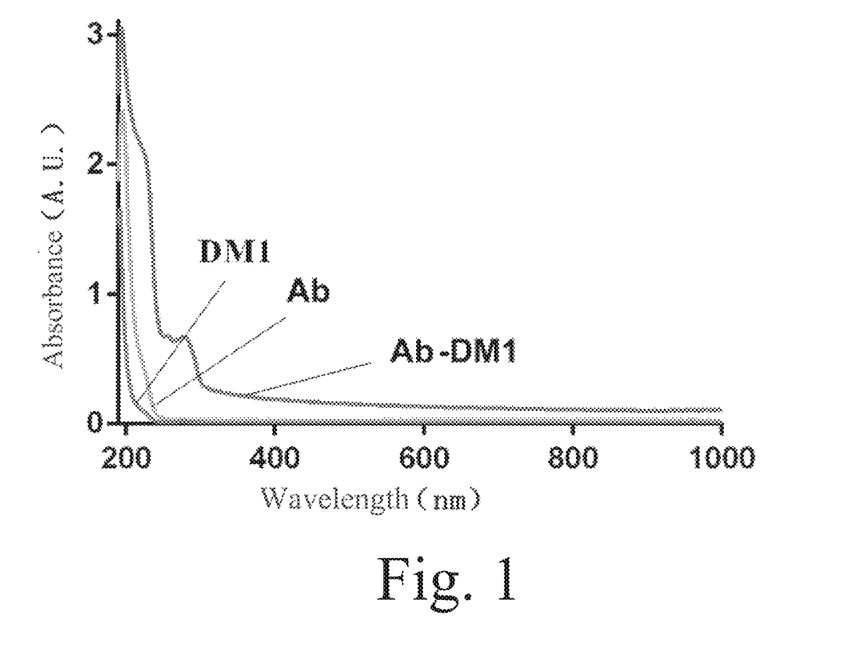
FIG. 1 is a UV absorption spectrum for DM1, Ab, and Ab-DM1.

As can be seen from FIG. 1, DM1 has the highest absorption peak at 252 nm, Ab has the highest absorption peak at 280 nm, and Ab-DM1 has the highest absorption peak at 268 nm.

2) Analysis of drug-to-antibody ratio

A DM1 concentration-absorbance value standard curve was created. The mass of DM1 in Ab-DM1 was calculated from the standard curve. The mass of the antibody was obtained through BCA quantification. The mole numbers of the molecules were calculated according to the molar law, n=m/M. The experiment was repeated three times, and the average value was calculated.

It was calculated from the antibody-to-drug molar ratio that about 3.6 DM1s were covalently bound to each antibody.

3) IR absorption spectrum

Figure 2:
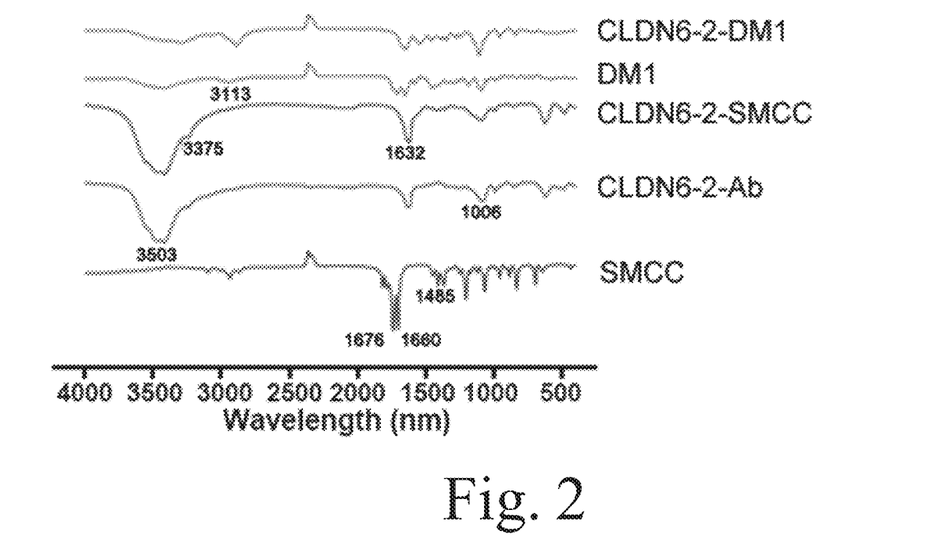
FIG. 2 is an IR absorption spectrum for DM1, Ab, and Ab-DM1.

The IR absorption spectra for SMCC, Ab, Ab-SMCC, DM1, and Ab-DM1 were determined respectively, and the results were shown in FIG. 2.

The results in FIG. 2 show that SMCC has specific —C=O bonds at 1660 nm and 1676 nm, and a —C=C— bond at 1485 nm; Ab has a —CNH$_2$— bond at 1006 nm; Ab-SMCC has a —C=O bond at 1632 nm, and a specific —NH$_2$ bond at 3375 nm; and DM1 has a —NH— bond at 3113 nm. The specific chemical bonds of various molecular groups can be seen from the absorption spectrum for Ab-DM1, indicating that the construction is successful.

4) Particle size and potentiometric analysis

The particle sizes and Zeta potentials of Ab, Ab-SMCC, and Ab-DM1 were determined respectively, and the results were shown in FIG. 1. As can be seen from Table 1, the particle size of Ab-SMCC significantly changed, which was probably because the strong polarity of SMCC allowed it to be polymerized with the antibody, and the Zeta potential of Ab-SMCC also changed, indicating that the antibody was successfully modified.

TABLE 1

| Particle size and Zeta potential | | | |
|---|---|---|---|
| | Ab | Ab-SMCC | Ab-DM1 |
| Particle size (±SD nm) | 33.12 ± 7.61 | 338.4 ± 9.33 | 29.89 ± 7.55 |
| Zeta potential (±SD mV) | −14.51 ± 1.32 | −18.60 ± 1.46 | −5.48 ± 1.42 |

Example 4 Cell Experiment (I) Cell membrane staining experiment by flow cytometry The binding effects of the antibody-drug conjugate prepared in Example 3 with the HepG2 cells and the PLC-8024 cells respectively were determined through a cell membrane staining experiment by flow cytometry, which comprised the following steps.

1. The cells were resuspended in 0.5-1 mL 1×PBS, distributed into flow tubes, and centrifuged.
2. The cells were resuspended in 1×PBS, and centrifuged, and the supernatant was discarded. This step was repeated twice.
3. The cells were resuspended in 100 μL diluted antibody or antibody-drug conjugate.
4. The suspension was incubated on ice for 15-30 minutes, and then centrifuged, and the supernatant was discarded.
5. The cells were resuspended in 1×PBS, and centrifuged, and the supernatant was discarded. This step was repeated twice.
6. The cells were resuspended in 100 μL diluted secondary antibody labeled with a fluorescent dye.
7. The suspension was incubated on ice for 30 minutes, and then centrifuged, and the supernatant was discarded.
8. The cells were resuspended in 1×PBS, and centrifuged, and the supernatant was discarded. This step was repeated.
9. The cells were resuspended in 1×PBS, and analyzed by a flow cytometer.

Figure 3:
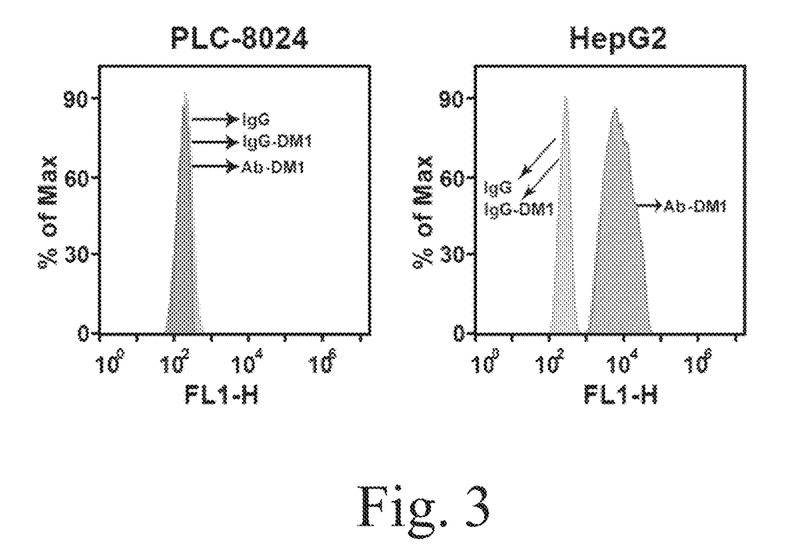
FIG. 3 shows the antigen epitope binding effects of the antibody-drug conjugate in different liver cancer cell lines.

The results of the flow cytometry were shown in FIG. 3. The antibody-drug conjugate prepared in the present disclosure had significantly different antigen epitope binding effects in different liver cancer cell lines. The antigen binding capacity was strong on the membrane surface of the HepG2 cell line having a positive expression of Claudin 6, and was weak on the membrane surface of the PLC-8024 cell line having a negative expression of Claudin 6.

(II) The endocytosis of the antibody-drug conjugate in the liver cancer cell lines The endocytosis of the antibody-drug conjugate prepared in Example 3 in the HepG2 cells was further determined. The cells were divided into two groups: the CLDN6-Ab group and the CLDN6-DM1 group, wherein the monoclonal antibody prepared in Example 2 was used in the CLDN6-Ab group, and the antibody-drug conjugate prepared in Example 3 was used in the CLDN6-DM1 group. The experiment procedure was as follows.
1. The HepG2 cells were cultured to a cell density of about 3×10⁴/well.
2. The monoclonal antibody or antibody-drug conjugate was added to the cell culture medium at a final concentration of 1 μM.
3. The cells were cultured in an incubator at 37° C. for 1-8 hours.
4. The incubation was ended with the culture medium absorbed, and the cells were washed with PBS twice.
5. A methanol solution was added to fix the cells at room temperature for 20 min.
6. The methanol solution was removed, and the cells were washed with PBS three times at room temperature, 5 min for each time.
7. The secondary antibody was added dropwise, and the cells were incubated at room temperature away from light for 1 h.
8. The cells were washed with PBS 3 times, 5 min for each time.
9. The cells were observed and photographed with a confocal fluorescent microscope.

Figure 4:
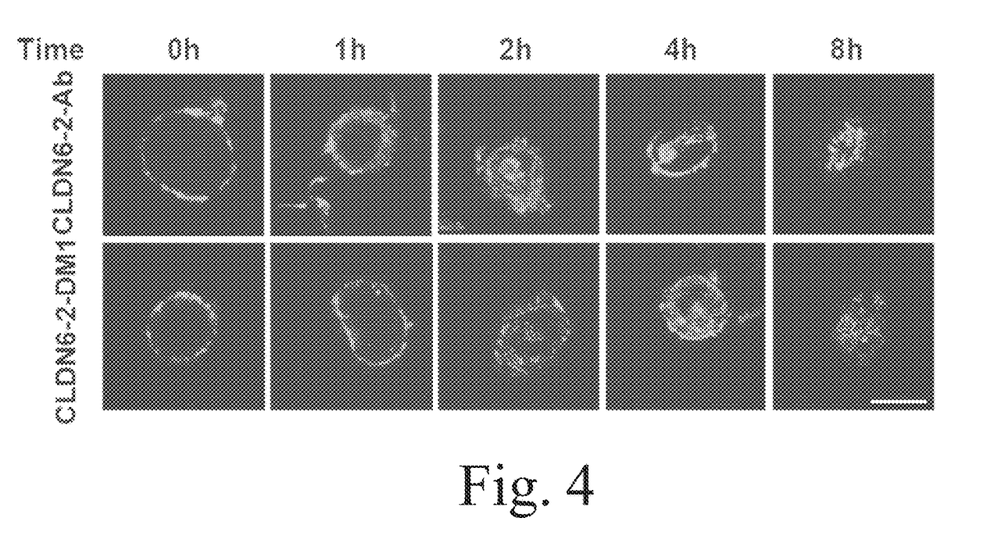
FIG. 4 shows the endocytosis result of the monoclonal antibody and the antibody-drug conjugate prepared therewith in the liver cancer cell lines.

The results were shown in FIG. 4. Both the monoclonal antibody (CLDN6-Ab) and its corresponding antibody-drug conjugate (CLDN6-DM1) could be bound to the antigen on the membrane surface of the liver cancer cell lines to be endocytosed into the cells, and then specifically kill the cells.

(III) The efficacy of the antibody-drug conjugate:

The liver cancer cell line HepG2 having a positive expression of Claudin 6 and the liver cancer cell line PLC-8024 having a negative expression of Claudin 6 were evaluated for efficacy respectively. There were 3 groups, the group of single drug in which DM1 was directly used, the group of the isotype control-drug conjugate in which IgG-DM1 was used, and the group of the antibody-drug conjugate in which the antibody-drug conjugate prepared in Example 3, CLDN6-DM1, was used.

The experiment procedure was as follows.

The cells were seeded into a 96-well plate with 1000 cells in each well. After 24 hours of cell culture, different concentrations (0-172 μM) of drugs (DM1, CLDN6-DM1, and IgG-DM1) were added into each well respectively. After 72 hours of drug treatment, the inhibition rate of the cell growth was determined.

Figure 5:
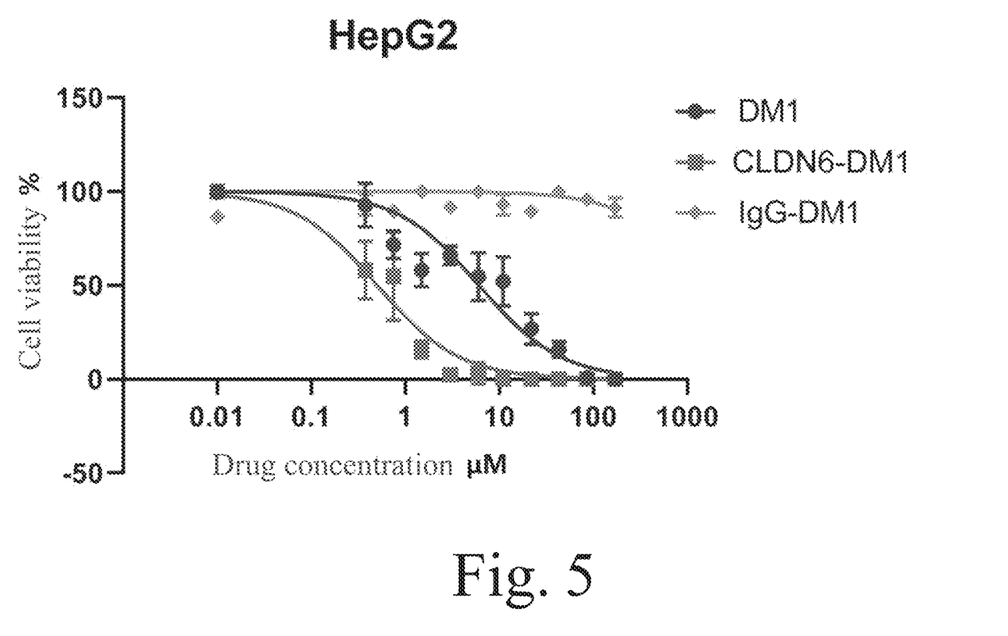
FIG. 5 shows the killing effect of the antibody-drug conjugate on the liver cancer cell line HepG2.
Figure 6:
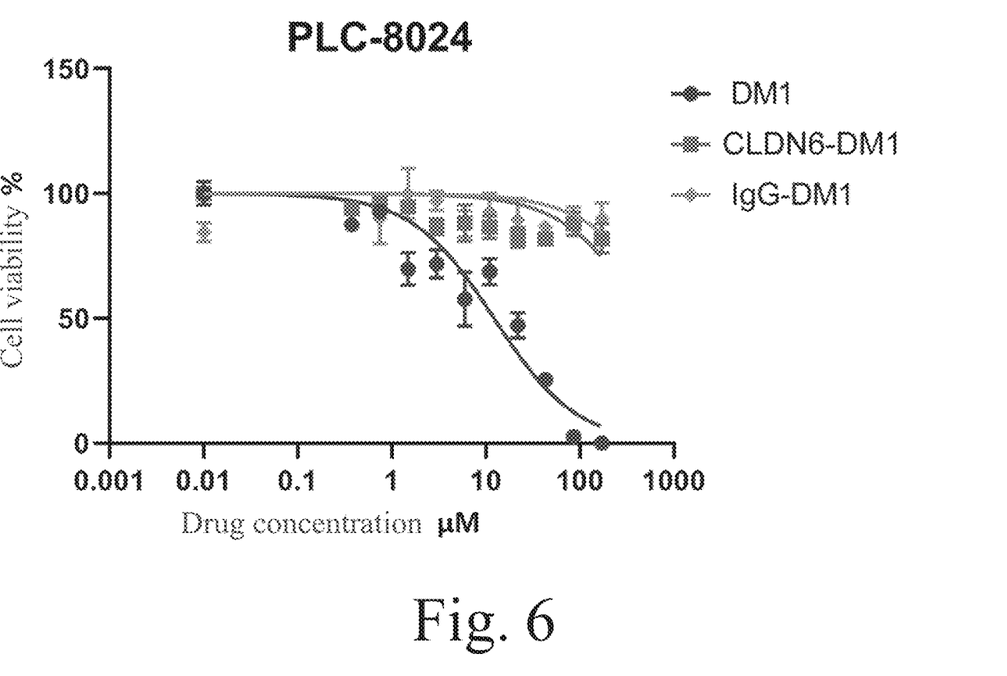
FIG. 6 shows the killing effect of the antibody-drug conjugate on the liver cancer cell line PLC-8024.

The results show that the antibody-drug conjugate has more sensitive killing effect than single drug in the liver cancer cell line HepG2 having a positive expression of Claudin 6 (as shown in FIG. 5), whereas the antibody-drug conjugate substantially has no effect in the liver cancer cell line PLC-8024 having a negative expression of Claudin 6 (as shown in FIG. 6). Thus, it can be indicated that this antibody-drug conjugate has specific killing effect in vitro.

Example 5 Animal Experiment

The liver cancer cell line HepG2 having a positive expression of Claudin 6 was selected for subcutaneously injecting 10⁶ cells on the dorsal side of a nude mouse. The tumor mass was removed after it was observed that the tumor volume reached 1000 mm³. The tumor mass was divided into small tumor masses with the same volume (around 1-5 mm³), which were subcutaneously inoculated on the dorsal sides of a plurality of nude mice. The administration was performed after it was observed that the tumor volume reached 50-150 mm³.

The tumor-bearing mice were randomly divided into four groups (with 5 mice in each group): the group of the isotype control-drug conjugate (in which IgG-DM1 was used), the group of the complex of the Claudin 6 antibody-drug conjugate (in which CLDN6-DM1 was used), the group of the combination of the isotype control-drug conjugate and sorafenib (in which sorafenib and IgG-DM1 were used), and the group of the combination of the antibody-drug conjugate and sorafenib (in which sorafenib and CLDN6-DM1 were used).

Figure 7:
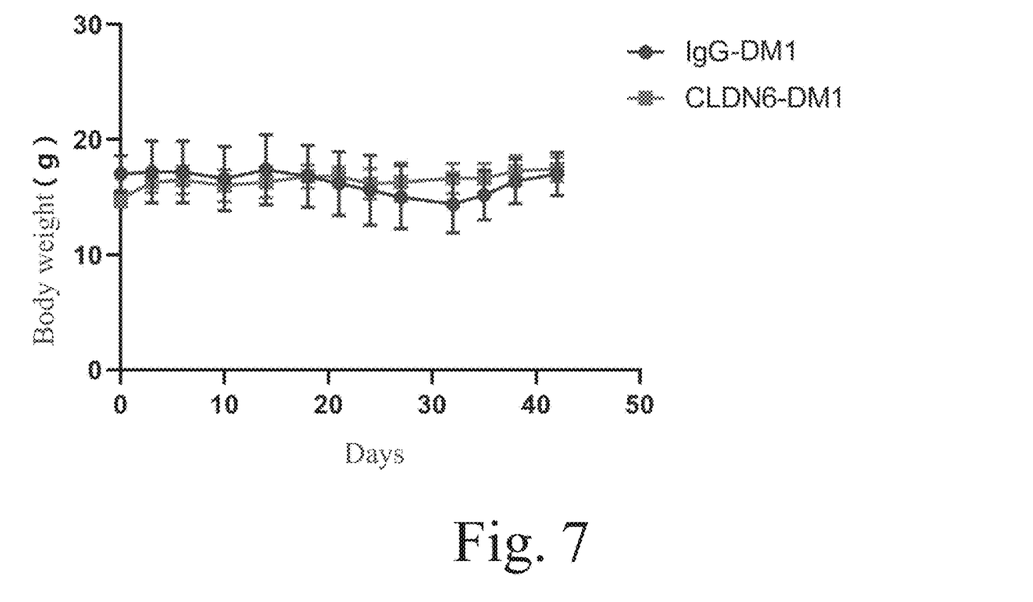
FIG. 7 shows the body weight comparison between the group of the isotype control-drug conjugate and the group of the antibody-drug conjugate in the in vivo experiment of subcutaneous tumorigenesis in nude mice.
Figure 8:
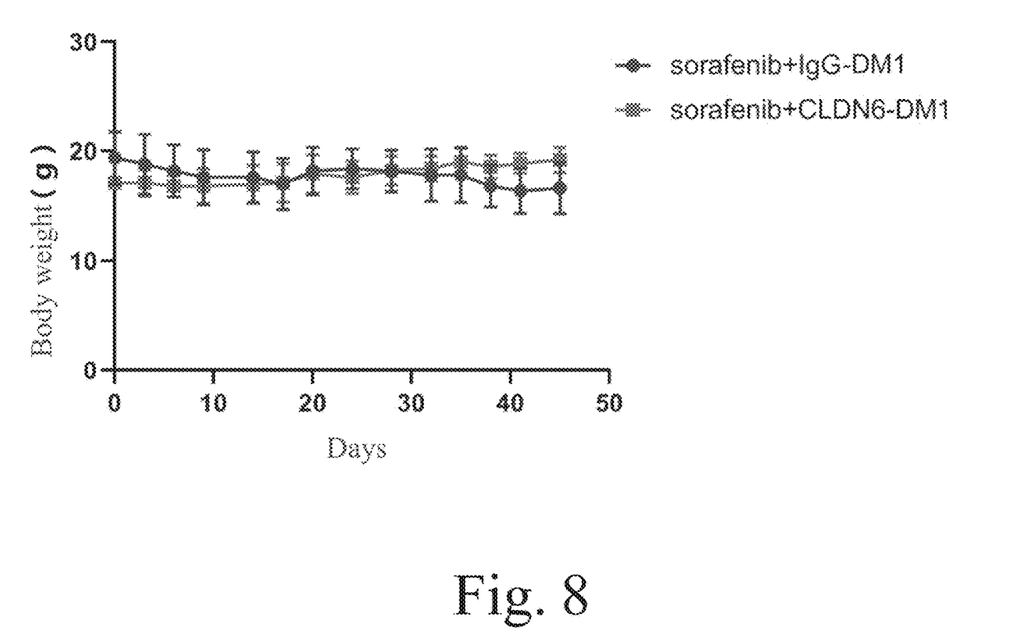
FIG. 8 shows the body weight comparison between the group of the combination of the isotype control-drug conjugate and sorafenib and the group of the combination of the antibody-drug conjugate and sorafenib in the in vivo experiment of subcutaneous tumorigenesis in nude mice.
Figure 9:
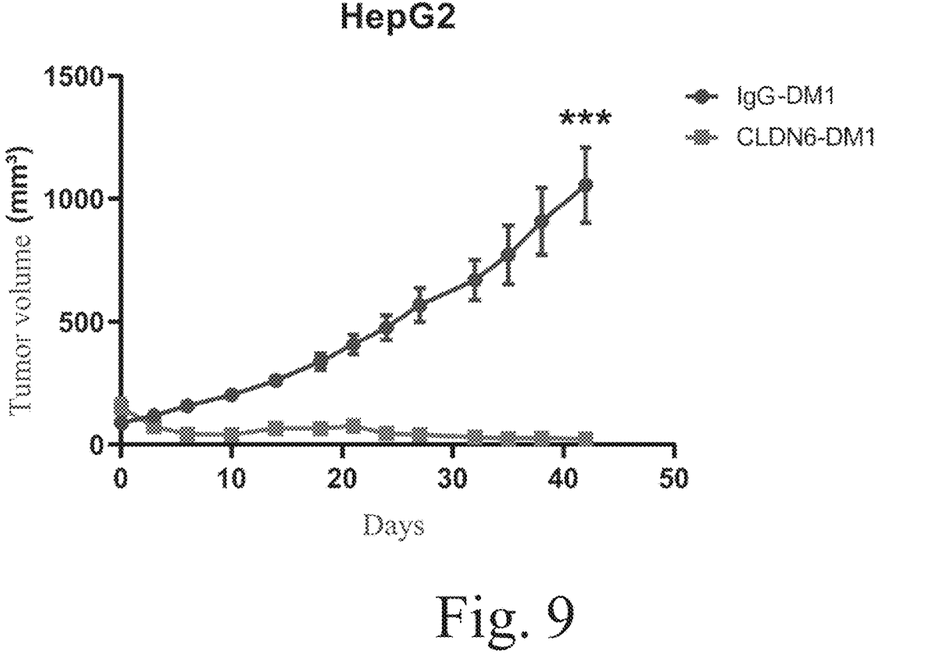
FIG. 9 shows the tumor growth comparison between the group of the isotype control-drug conjugate and the group of the antibody-drug conjugate in the in vivo experiment of subcutaneous tumorigenesis in nude mice.
Figure 10:
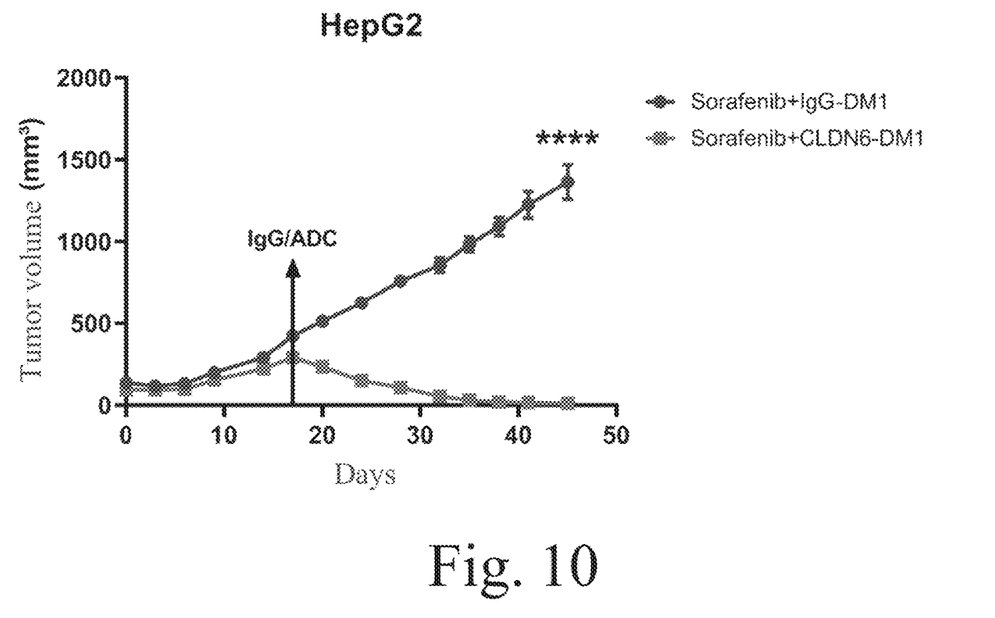
FIG. 10 shows the tumor growth comparison between the group of the combination of the isotype control-drug conjugate and sorafenib and the group of the combination of the antibody-drug conjugate and sorafenib in the in vivo experiment of subcutaneous tumorigenesis in nude mice.

Here, sorafenib was administered by intraperitoneal injection at a concentration of 20 mg/kg. The isotype control-drug conjugate and the antibody-drug conjugate were administrated by tail intravenous injection at a concentration of 4 mg/kg. In the administration experiments of the latter two groups (the group of the combination of the isotype control-drug conjugate and sorafenib, and the group of the combination of the antibody-drug conjugate and sorafenib), single drug of sorafenib was firstly administrated, and the tumor was observed and measured; on the 18th day of tumor growth, the isotype control-drug conjugate or the antibody-drug conjugate was further added for the combination; after administration, the subcutaneous tumor growth and the body weight change of the mice were observed, and measured twice per week. The results of the body weight measurements were shown in FIGS. 7 and 8, and the tumor growth curves were shown in FIGS. 9 and 10. The result of body weight change showed that there was no obvious difference in body weight between the groups, indicating that the medicant of each group had no obvious toxicity in vivo.

Figure 11:
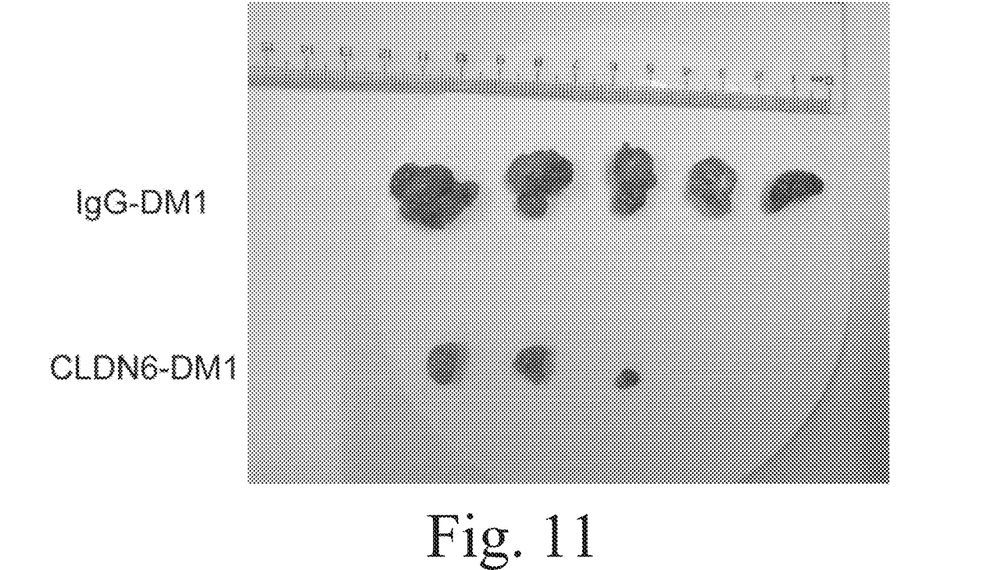
FIG. 11 shows the tumor size comparison between the group of the isotype control-drug conjugate and the group of the antibody-drug conjugate in the in vivo experiment of subcutaneous tumorigenesis in nude mice.
Figure 12:
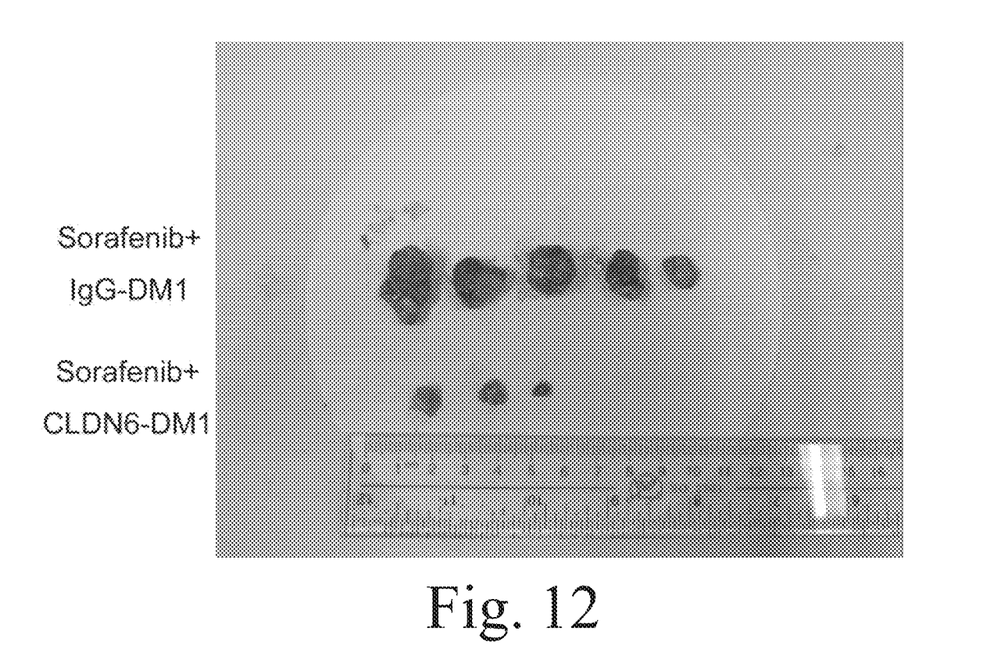
FIG. 12 shows the tumor size comparison between the group of the combination of the isotype control-drug conjugate and sorafenib and the group of the combination of the antibody-drug conjugate and sorafenib in the in vivo experiment of subcutaneous tumorigenesis in nude mice.

After the experiment, subcutaneous tumors of the nude mice in each group were removed, and the results were shown in FIGS. 11 and 12.

As shown in FIGS. 9-12, each group inhibited the growth of the tumor, but the inhibition effects were as follows: the group of the combination of the antibody-drug conjugate and sorafenib>the group of the Claudin 6 antibody-drug conjugate>the group of the combination of the isotype control-drug conjugate and sorafenib>the group of the isotype control-drug conjugate.

Example 6 In Vitro Efficacy Evaluation of Primary Drug

Figure 13:
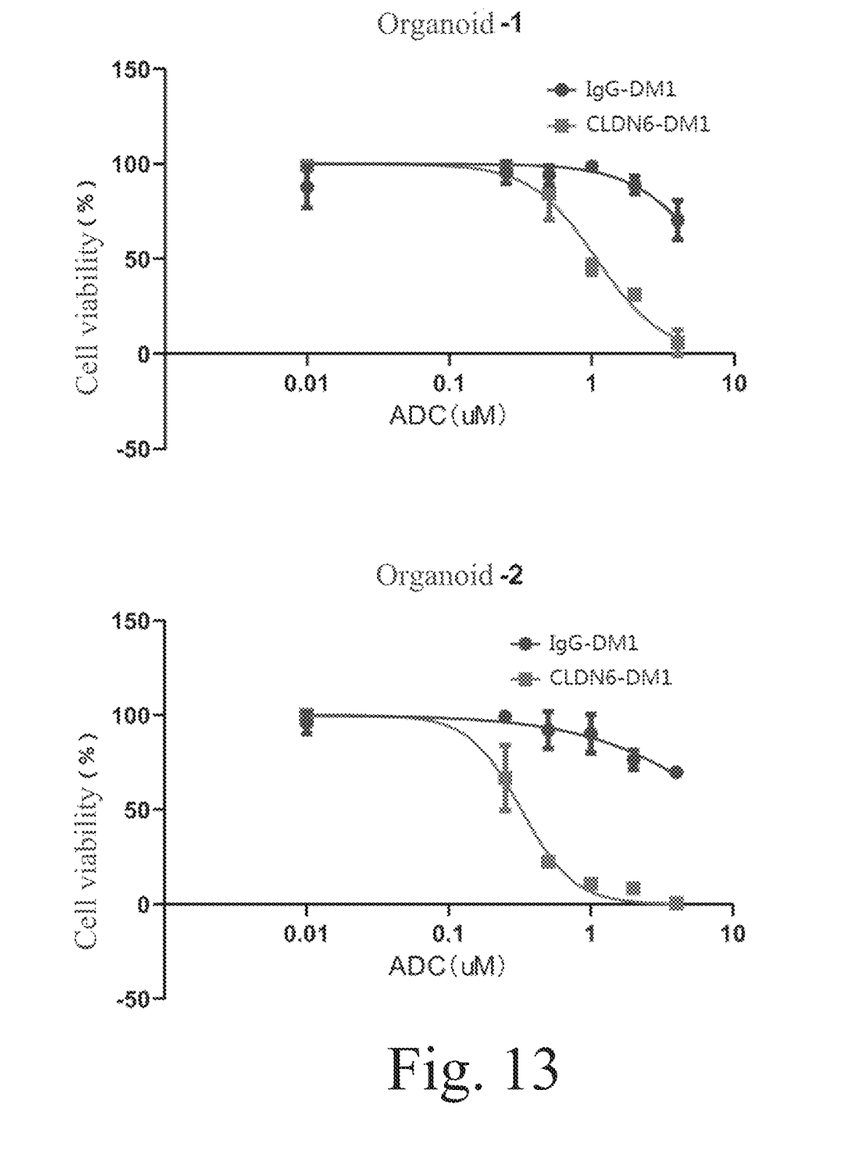
FIG. 13 shows the results of the drug sensitive test for primary organoids derived from five patients with liver cancer.

The cancer tissues were collected from five patients with liver cancer for organoid culture. After about 2 weeks of culture, the cancer tissues were subcultured and seeded in a 96-well culture plate. 24 hours after seeding, different concentrations of medicants (the isotype control-drug conjugate or the antibody-drug conjugate) were added respectively. The cell activities were determined respectively after 72 hours, and efficacy curves were drawn. The results were shown in FIG. 13.

Figure 14:
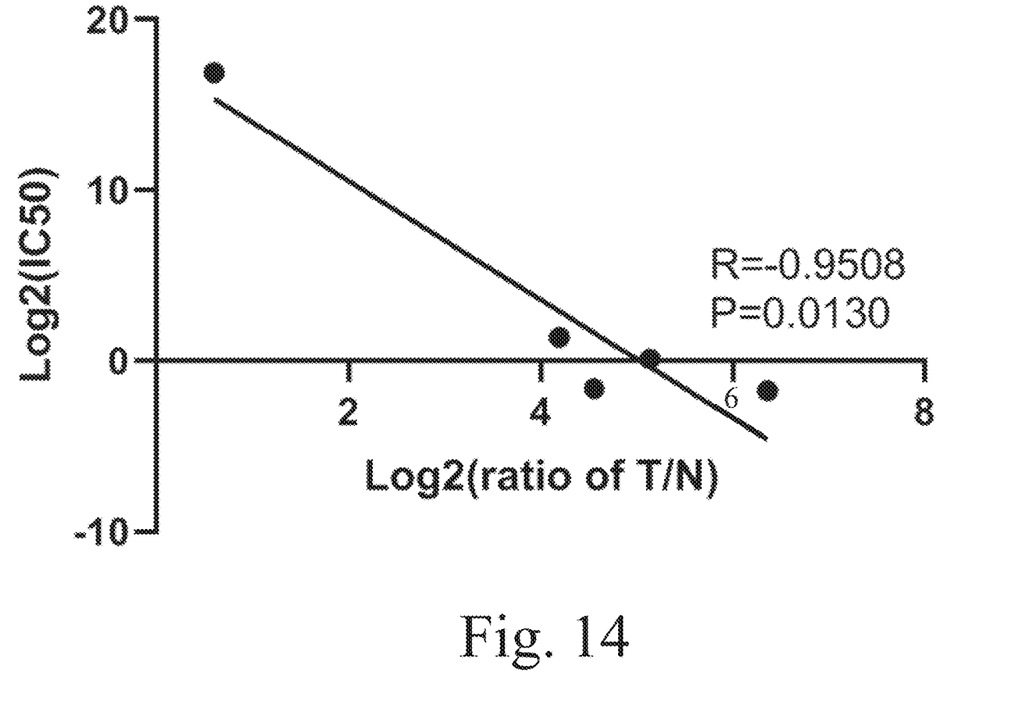
FIG. 14 shows the correlation between the increasing factor of the CLDN6 expression in the cancer tissues of five patients with liver cancer and the sensitivity thereof to the ADC drug (IC50).

The difference in Claudin 6 expression between the cancer tissues and corresponding normal liver tissues of five patients with liver cancer were determined and analyzed respectively. The result was shown in FIG. 14. It can be found from FIG. 14 that the increasing factor of the CLDN6 expression in the cancer tissues relative to corresponding normal liver tissues is negatively correlated to the drug IC50.

Finally, it should be noted that the above examples are only intended to describe the technical solutions of the present disclosure, but not to limit the protection scope of the present disclosure. Although the present disclosure is described in detail with reference to preferred examples, it should be appreciated by those skilled in the art that modification or equivalent substitution can be made on the technical solutions of the present disclosure without departing from the spirit and scope of the technical solutions of the present disclosure.

The invention claimed is:

1. A mouse hybridoma monoclonal cell C6-e11 which is deposited on Nov. 12, 2019 with a deposit number of CCTCC NO. C2019282.

2. An anti-Claudin 6 monoclonal antibody which is produced by the mouse hybridoma monoclonal cell C6-e11 according to claim 1.

3. An antibody-drug conjugate comprising the anti-Claudin 6 monoclonal antibody according to claim 2, a linking structure, and a drug, wherein the linking structure is connected to the anti-Claudin 6 monoclonal antibody and the drug respectively.

4. The antibody-drug conjugate according to claim 3, wherein the linking structure is succinimidyl 4-(N-maleimidomethyl) cyclohexane-1-carboxylate (SMCC), and the drug is maytansine.

5. A pharmaceutical composition, comprising the antibody-drug conjugate according to claim 3.

6. The pharmaceutical composition according to claim 5, further comprising sorafenib.

7. A method of preparing a medicant or pharmaceutical composition for treating a tumor having a positive expression of Claudin 6, comprising:
    (1) mixing the anti-Claudin 6 monoclonal antibody according to claim 2 with SMCC in a conjugation buffer, and then reacting to obtain a modified antibody; and
    (2) mixing the modified antibody with maytansine in a PBS buffer, and then reacting to obtain an antibody-drug conjugate,
    wherein the medicant or pharmaceutical composition comprises the antibody-drug conjugate, and wherein the treating comprises administering the medicant or pharmaceutical composition to a subject with a tumor having a positive expression of Claudin 6.

8. The method according to claim 7, wherein the tumor having a positive expression of Claudin 6 is a liver tumor.

* * * * *

SEQUENCE LISTING

<160> NUMBER OF SEQ ID NOS: 2

<210> SEQ ID NO 1
<211> LENGTH: 12
<212> TYPE: PRT
<213> ORGANISM: Artificial Sequence
<220> FEATURE:
<223> OTHER INFORMATION: Synthetic

<400> SEQUENCE: 1

Leu Pro Met Trp Lys Val Thr Ala Phe Ile Gly Asn
1               5                   10

<210> SEQ ID NO 2
<211> LENGTH: 13
<212> TYPE: PRT
<213> ORGANISM: Artificial Sequence
<220> FEATURE:
<223> OTHER INFORMATION: Synthetic

<400> SEQUENCE: 2

Leu Pro Met Trp Lys Val Thr Ala Phe Ile Gly Asn Cys
1               5                   10